United States Patent Office 2,817,614
Patented Dec. 24, 1957

2,817,614

INTERNALLY PLASTICIZED MELAMINE RESINS AND LAMINATES MADE THEREWITH

George L. Fraser, Wilbraham, Mass., assignor to Monsanto Chemical Company, St. Louis, Mo., a corporation of Delaware No Drawing. Application October 26, 1953,
Serial No. 388,425

11 Claims. (Cl. 154—43)

This invention relates to internally plasticized melamine resins. More particularly, this invention relates to internally plasticized melamine resins that can be used to prepare post-formable laminates.

Melamine-aldehyde resins comprise a well-known class of thermosetting compositions useful for many purposes such as the preparation of surface coatings, molding powders, adhesives, laminating syrups, etc. Unmodified melamine resins have poor flow properties during curing operations and this has created a serious problem. It has been proposed to mix melamine resins with flow promoting agents such as polyesters, polyethylene glycols, etc. which do not chemically combine with the melamine resin. Flow promoting agents of this nature are commonly referred to as external plasticizers and are most advantageously used in preparing non-aqueous compositions such as baking enamels, adhesives, etc.

Most conventional external plasticizers are either water-insoluble or incompatible with melamine resins in aqueous solutions and, accordingly, cannot be used successfully in preparing compositions comprising aqueous solutions of a melamine-aldehyde resin. When aqueous solutions of this nature are to be prepared, it is common practice to use an internal plasticizer which is chemically combined in the melamine resin. Thus, compounds such as aromatic sulfonamides, aromatic amines, aromatic amides, etc. may be reacted with melamine and an aldehyde to form internally plasticized resins that can be dissolved in water without adverse effects. Internally plasticized melamine resins of this nature are commonly used in the preparation of laminating syrups which comprise a solution of the resin in water or a mixture of water with a lower aliphatic alcohol. Such laminating syrups are particularly useful in the preparation of decorative laminates having high surface gloss coupled with excellent chemical and physical resistance properties. However, conventional laminates of this nature have generally proved unsatisfactory for post-forming operations wherein the laminate is heated and bent about a form into a different shape.

Accordingly, an object of the present invention is the provision of internally plasticized melamine resins.

Another object is the provision of internally plasticized melamine resins that can be used to prepare post-formable laminates.

These and other objects are attained by co-condensing melamine with formaldehyde or a polymer thereof and a member of a restricted class of aralkyl guanamines as hereinafter defined.

The following examples are given by way of illustration and are not intended as limitations on the scope of the invention. Where parts are mentioned, they are parts by weight.

*Example I*

Mix 100 parts of melamine with 200 parts of a 37% solution of formaldehyde and adjust the pH of the mixture to about 9.5 to 10.0 with an aqueous solution of sodium hydroxide. Heat the mixture to a temperature of about 80° C. in order to initiate a condensation reaction between the melamine and the formaldehyde. As soon as the reaction has been initiated, add 40 parts of phenylacetoguanamine (2 - phenylmethyl - 4,6 - diamino - 1,3,5-triazine) and then continue the reaction at a temperature of about 85 to 90° C. for about 4 hours. Stop the reaction by cooling the reaction mixture when the co-condensation product has a 25° C. hydrophobe (i. e., when the co-condensation product is hydrophilic with respect to water at a temperature of 25° C. or higher but hydrophobic with respect to water at a temperature of less than 25° C.). About 25% by weight of the co-condensation product formed as a result of this reaction is derived from the phenylacetoguanamine. Dilute the co-condensation product with water to form a 50% solids solution thereof which is useful as a laminating syrup.

*Example II*

Dip sheets of alpha-cellulose in the laminating syrup of Example I and remove the sheets slowly therefrom at a rate such that the impregnated sheets comprise about 65% by weight of resin on a dry weight basis. Dry the sheets at 110° C. until the volatile content of the sheets is less than 5%. This will normally require less than half an hour. Assemble a plurality of such sheets to form a sandwich and mold the sandwich at a pressure of about 1000 p. s. i. and a temperature of about 150° C. for about 15 minutes. Remove the laminate from the mold and cool. The laminate so produced has an attractive appearance, high surface gloss and good chemical and physical resistance properties. Heat a section of the cooled laminate to a temperature of about 175 to 200° C. and then form the heated section about a ⅜ inch mandrel to produce a 90° bend. Cool the laminate about the mandrel and then remove. The laminate maintains the curved shape and possesses all of the properties that it had prior to the post-forming operation with special reference to surface appearance and gloss, which is unimpaired. There is no evidence of crazing, cracking or delamination.

As another example, prepare a sandwich comprising a core of sheets of kraft paper and crepe paper impregnated with a post-formable cresol-formaldehyde resin, and cover sheets of the above-described modified melamine resin-impregnated alpha-cellulose. Form a laminate by pressing the sandwich at a pressure of about 1000 p. s. i. and a temperature of about 150° C. for about 15 minutes. Cool the laminate formed as a result of this operation. Heat a section of the cooled laminate to a temperature of about 180° C. and then form the heated section about a ⅜ inch mandrel to produce a 90° bend. Cool the laminate about the mandrel. The cooled post-formed laminate maintains the curved shape, is not crazed, cracked or delaminated and has suffered no appreciable loss of physical or chemical properties.

*Example III*

Add 100 parts of melamine to 200 parts of a 37% aqueous solution of formaldehyde and adjust the pH to about 9.5 to 10.0 with an aqueous solution of sodium hydroxide. Heat to a temperature of about 80° C. and add 50 parts of 4-N-ethyl-phenylvaleroguanamine (2-phenylbutyl - 4 - ethylamino - 6 - amino - 1,3,5 - triazine). Maintain this mixture at a temperature of about 85 to 90° C. for about 4 hours to form a co-condensation product. Terminate the reaction by cooling the reaction mixture when the co-condensation product has a 10° C. hydrophobe point. A syrupy aqueous solution of the co-condensation product is obtained, about 25% by weight of the co-condensation product being derived from the guanamine. Spray dry the aqueous syrup to obtain a pulverulent material which may be readily dispersed in water. The powder is fusible and may be cured under heat and pressure to an insoluble infusible state. Laminate two pieces of wood by placing between the pieces a thin layer of the powder followed by heating the sandwich at 150° C. for 10 minutes at 500 p. s. i. During the laminating step, the resin flows readily to form a thin continuous film which penetrates the fibers of the wood and bonds the pieces of wood together.

The powder can be dissolved in water or a mixture comprising a major amount of water and a minor amount of a lower aliphatic alcohol in order to form a laminating syrup. The laminating syrup can be used to prepare post-formable laminates similar to the laminates of Example II.

Example IV

Mix together 100 parts of melamine, 250 parts of a 37% aqueous solution of formaldehyde and 60 parts of 4-N-phenyl-phenyl acetoguanamine (2-phenylmethyl-4-phenylamino-6-amino-1,3,5-triazine). Adjust the pH of the mixture to about 9.5 to 10.0 with an aqueous solution of sodium hydroxide. Heat the mixture at a temperature of about 90° C. to form a resinous co-condensation product, terminating the reaction by cooling the reactive mixture when a sample of the co-condensation product has a 25° C. hydrophobe point. A syrupy aqueous solution of the co-condensation product is obtained, about 25% by weight of the co-condensation product being derived from the guanamine. Spray dry the aqueous syrup to obtain a powdered resin. Blend 100 parts of the powder with 100 parts of wood flour and mold the blend under heat and pressure to form a solid unitary article. A pressure of from 100 to 1000 p. s. i. and a temperature of from 100 to 250° C. may be used. On removal from the mold, the article is found to have high gloss and excellent chemical and physical resistance properties. The resin substantially completely surrounds and impregnates the filler to give a homogeneous product.

The powdered co-condensation product can be dissolved in water or a mixture of a major amount of water and a minor amount of a lower aliphatic alcohol to form a laminating syrup. The laminating syrup can be used to prepare post-formable laminates similar to the laminates of Example II.

Post-formability is obtained to only a minor degree when melamine-formaldehyde resins are internally plasticized with the closely related aryl guanamines as shown by the following example.

Example V

Mix 100 parts of melamine with 200 parts of a 37% aqueous solution of formaldehyde and adjust the pH of the mixture to about 9.5 to 10.0 with an aqueous solution of sodium hydroxide. Heat the mixture to about 80° C. and add 40 parts of benzoguanamine. Maintain the reaction mixture at a temperature of from about 85 to 90° C. for about 4 hours until a co-condensation product having a 25° C. hydrophobe is formed. Cool the reaction mixture and dilute the mixture with water to form a 50% solids aqueous solution of the co-condensation product.

Impregnate sheets of alpha-cellulose with the 50% solution as a laminating syrup and dry the sheets, adjusting the resin pickup so that the dried sheets comprise 65% by weight of resin. Prepare a sandwich comprising a surface layer of the impregnated alpha-cellulose and a core comprising sheets of kraft and crepe paper impregnated with a post-formable cresol-formaldehyde resin. Form a laminate by pressing the sandwich in a mold at a pressure of about 1000 p. s. i. and a temperature of about 150° C. for about 15 minutes. After removing from the mold and cooling, heat a section of the laminate to a temperature of about 200° C. Form the heated section about a ⅜ inch mandrel into a 90° bend. Cool the laminate on the mandrel and then remove. The cover sheet of impregnated alpha-cellulose is cracked and crazed.

The resins of the present invention are co-condensation products of melamine, formaldehyde or a polymer thereof and a particular class of aralkyl guanamines that act as internal plasticizers. The guanamines to be used in accordance with the present invention have the formula:

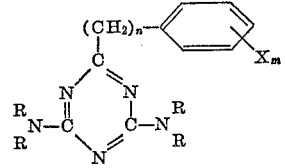

wherein $n$ is an integer of 1–4 inclusive, $m$ is an integer of 1–2 inclusive, X is taken from the group consisting of hydrogen, halogen and lower alkyl radicals having 1–4 carbon atoms inclusive, with the proviso that X may be different when $m$ is 2 and the R's are the same or different and are taken from the group consisting of hydrogen, unsubstituted phenyl radicals, methyl and halogen nuclearly substituted phenyl radicals and lower alkyl radicals having 1–4 carbon atoms inclusive, at least one of the R's being hydrogen and not more than one of the R's being taken from the group consisting of substituted and unsubstituted phenyl radicals. That is to say, the R's taken together are members of the group consisting of hydrogen and heterologous mixtures of hydrogen, unsubstituted phenyl radicals, methyl and halogen nuclearly substituted phenyl radicals and lower alkyl radicals having 1–4 carbon atoms inclusive, at least one R of said heterologous mixtures being hydrogen and not more than one R being phenyl, as indicated above. Reference to a compound containing a heterologous mixture of radicals is a method of defining a guanamine of the above formula wherein the R's are not all the same. The halogen may be chlorine, bromine, fluorine or iodine.

Illustrative of the guanamines of the present invention are phenylacetoguanamine (2-phenylmethyl-4,6-diamino-1,3,5-triazine), phenylpropionoguanamine (2-phenylethyl-4,6-diamino-1,3,5-triazine), phenylvaleroguanamine (2-phenylbutyl-4,6-diamino-1,3,5-triazine), tolylacetoguanamine (2-tolylmethyl-4,6-diamino-1,3,5-triazine), 2-(orthochlorphenyl)methyl-4,6-diamino-1,3,5-triazine, 2-(2,5-dichlorophenyl)methyl-4,6-diamino-1,3,5-triazine, 4-N-methylphenylacetoguanamine (2-phenylmethyl-4-methylamino-1,3,5-triazine), 4-N-ethylphenylacetoguanamine (2-phenylmethyl-4-ethylamino-1,3,5-triazine), 4-N-ethylphenylvaleroguanamine (2-phenylbutyl-4-ethylamino-1,3,5-triazine), 2-phenylmethyl-4,6-dimethylamino-1,3,5-triazine, 4-N-phenyl-phenylacetoguanamine (2-phenylmethyl-4-phenylamino-6-amino-1,3,5-triazine), etc. Mixtures of two or more such guanamines may be used if desired. The guanamines of the present invention can be prepared by various well-known methods such as those described in U. S. Patent No. 2,427,314 to Thurston and British Patent No. 642,409.

The amount of formaldehype to be reacted with the melamine will vary depending on the final use for which the resin is intended. If desired, an equivalent amount of a polymer of formaldehyde such as paraformaldehyde, trioxymethylene, etc., may be used in place of part or all of the formaldehyde. Generally, the amount of formaldehyde or polymer thereof to be used should be such that from about 1 to 6 equivalents of aldehyde radical are present for each mol of melamine. Resins for use in laminating syrups are prepared by reacting from 2 to 4 mols and preferably about 3 mols of formaldehyde or an equivalent amount of a polymer thereof with each mol of melamine. If a molding powder is to be prepared, it is generally preferable to use more formaldehyde.

The reaction between melamine, the aralkyl guanamine and formaldehyde should be carried out at a pH of from 8 to 12 and preferably at a pH of from 9 to 11.

The pH of the reaction mixture is conveniently adjusted with an aqueous solution of an alkali such as sodium hydroxide, potassium hydroxide, triethanolamine, etc. The temperature of the reaction may be varied from about 40° C. to reflux temperature at atmospheric pressure. For purposes of accurate control of reaction rate and in order to control the properties of the reaction product, it is preferable to conduct the reaction at a temperature of from about 80 to 100° C. for the greater part of the reaction time. A convenient procedure is that shown in Example I wherein a mixture of melamine and formaldehyde is brought to reaction temperature in order to initiate reaction, at which time, the aralkyl guanamine is added. However, if desired, the guanamine may be admixed with melamine and formaldehyde prior to the reaction, as shown in Example IV. The aralkyl guanamine may also be added after the melamine and formaldehyde have been partially condensed. However, the aralkyl guanamines of the present invention are internal plasticizers which should be reacted in with the melamine and formaldehyde to form a co-condensation product. Accordingly, if delayed addition of the aralkyl guanamine is resorted to, the delay in addition should not be so prolonged that the guanamine does not have an opportunity to substantially completely react with the melamine and formaldehyde.

Since the aralkyl guanamines of the present invention function primarily as internal plasticizers, the amount to be used will vary depending upon the amount of formaldehyde reacted with the melamine, the extent to which the melamine resin is to be plasticized, the compatibility of the aralkyl guanamine with the melamine and formaldehyde, etc. Generally speaking, it is preferable to use less than one mol of guanamine per mol of melamine and to use an amount of guanamine such that from about 10 to 35% by weight of the co-condensation product is derived from the aralkyl guanamine. As a general rule, if from about 1/20 to 1/4 mol of aralkyl guanamine per mol of melamine is used, the desired amount of aralkyl guanamine derivative will be present in the co-condensation product and the resultant resin will be post-formable.

The resinous co-condensation products of the present invention, while still in a fusible condition, are preferably compounded with suitable inert fillers in order to increase the strength of articles formed therefrom. Thus, for example, the resin may be dried, comminuted and mixed with a finely-divided filler in order to form a molding powder or the resin may be dissolved in a suitable solvent to form a laminating syrup for impregnating a sheeted filler. Among the inert fillers which may be used are glass, asbestos, paper, wood flour, cellulose, etc. The filled fusible resin can be formed into articles of utility by suitable molding processes wherein the resin is converted to a substantially insoluble infusible condition through the application of heat and pressure.

The laminating syrups of the present invention are preferably aqueous solutions of co-condensation products which are still water-soluble and fusible. Under some conditions, it is desirable to add to the water a monohydroxy aliphatic alcohol having from 1 to 4 carbon atoms (i. e., methanol, ethanol, propanol or butanol), especially if the condensation reaction has proceeded so far that the resin is more soluble in the alcohol than the water. When an alcohol is used, it should preferably comprise less than 50% by weight of the alcohol-water mixture. The condensation reaction is easily controlled by determining the hydrophobe point of samples drawn from the reaction mixture, the reaction being terminated when a predetermined hydrophobe is reached. It is preferable to use co-condensation products having a hydrophobe point of about 10 to 30° C.

Satisfactory laminating syrups comprise from about 40 to 60% by weight of co-condensation product. The amount of co-condensation product to be used is, in part, dependent upon the extent to which a sheet of filler is to be impregnated. Sheet materials useful as fillers may be prepared from separable formable elements by felting or weaving processes. Among the materials which have proven adaptable are paper, textiles such as cotton, nylon, glass cloth and batts, alpha-cellulose, etc. In preparing laminates, the core may comprise a composition quite different from the surface sheet or overlay. The high gloss and superior flow properties of the resins of this invention make them especially suitable as binders for overlay sheets, particularly where the overlay sheet is laminated over a decorative surface. The co-condensation products of the present invention can be post-formed without material impairment of chemical and physical properties. Accordingly, when the laminates are to be post-formed, it is usually preferable to use an inexpensive core material that may also be subjected to post-forming operations. Suitable core materials include fillers bonded with post-formable phenolic resins such as post-formable cresol-formaldehyde, cresol-phenol-formaldehyde, etc. resins.

The fusible co-condensation products of the present invention may be cured to an insoluble infusible state by being heated at a temperature of from about 100 to 250° C. It is not necessary to use a curing catalyst but a suitable catalyst may be used if desired. Pressures of at least about 50 p. s. i. should be used if a dense non-porous product is to be obtained.

In conducting post-forming operations, the portion of the laminate to be shaped should be heated to a temperature of from about 150 to 250° C. Normally, it is preferable to heat the laminate at this temperature for from about 30 seconds to 5 minutes. The temperature to be used and the time for which the laminate is to be heated are dependent on the thickness of the laminate, the nature of the core material, the extent to which the laminate is to be post-formed, etc.

What is claimed is:

1. A heat-hardenable internally plasticized resinous co-condensation product of 1 mol of melamine, 1–6 mols of an aldehyde taken from the group consisting of formaldehyde and polymers thereof and 0.05–0.25 mol of an aralkyl guanamine having the formula:

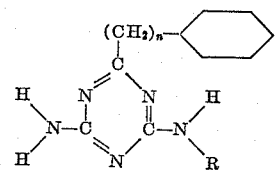

wherein $n$ is an integer of from 1 to 4 and R is taken from the group consisting of hydrogen and methyl, ethyl and phenyl radicals.

2. A resinous co-condensation product as in claim 1 wherein the aralkyl guanamine is phenyl acetoguanamine.

3. A resinous co-condensation product as in claim 1 wherein the aralkyl guanamine is 2-phenylbutyl-4-ethyl-amino-6-amino-1,3,5-triazine.

4. A resinous co-condensation product as in claim 1 wherein the aralkyl guanamine is 2-phenylmethyl-4-phenylamino-6-amino-1,3,5-triazine.

5. A laminating syrup comprising from 40 to 60% by weight of a post-formable co-condensation product of 1 mol of melamine with 2–4 mols of an aldehyde taken from the group consisting of formaldehyde and polymers thereof and 0.05–0.25 mol of an aralkyl guanamine in solution in from 60 to 40% by weight of a solvent taken from the group consisting of water and mixtures of a major amount of water and a minor amount of a monohydroxy aliphatic alcohol having from 1 to 4 carbon atoms, said aralkyl guanamine having the formula:

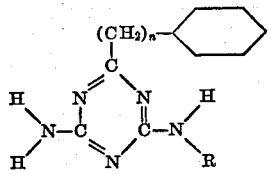

wherein $n$ is an integer of from 1 to 4 and R is a member of the group consisting of hydrogen and methyl, ethyl and phenyl radicals.

6. A laminating syrup comprising a 50% solids aqueous solution of a co-condensation product of 1 mol of melamine with about 3 mols of formaldehyde and 0.05 to 0.25 mol of phenyl acetoguanamine.

7. A laminating syrup comprising a 50% solids aqueous solution of a co-condensation product of 1 mol of melamine with about 3 mols of formaldehyde and 0.05 to 0.25 mol of 2-phenylbutyl-4-ethylamino-6-amino-1,3,5-triazine.

8. A laminating syrup comprising a 50% solids aqueous solution of a co-condensation product of 1 mol of melamine with about 3 mols of formaldehyde and 0.05 to 0.25 mol of 2-phenylmethyl-4-phenylamino-6-amino-1,3,5-triazine.

9. A composition of matter comprising an inert filler bonded with a heat-hardened co-condensation product of 1 mol of melamine, 1–6 mols of formaldehyde and 0.05 to 0.25 mol of an aralkyl guanamine having the formula:

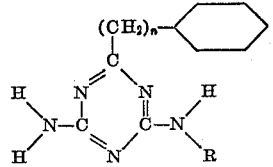

wherein $n$ is an integer of from 1 to 4 and R is a member of the group consisting of hydrogen and methyl, ethyl and phenyl radicals.

10. A normally rigid post-formable laminate comprising a sheeted inert filler bonded with a thermoset co-condensation product of 1 mol of melamine with 2–4 mols of formaldehyde and 0.05 to 0.25 mol of an aralkyl guanamine having the formula:

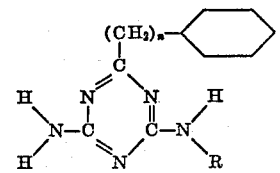

wherein $n$ is an integer of from 1 to 4 and R is a member of the group consisting of hydrogen and methyl, ethyl and phenyl radicals.

11. A normally rigid post-formable laminate comprising a cover sheet of inert filler bonded to a post-formable core material by a thermoset post-formable co-condensation product of 1 mol of melamine with from 2 to 4 mols of formaldehyde and from 0.05 to 0.25 mol of an aralkyl guanamine having the formula:

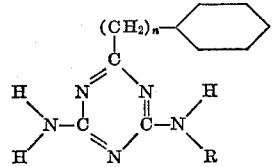

wherein $n$ is an integer of from 1 to 4 and R is a member of the group consisting of hydrogen and methyl, ethyl and phenyl radicals.

References Cited in the file of this patent

UNITED STATES PATENTS

| | | |
|---|---|---|
| 2,331,446 | Widmer et al. | Oct. 12, 1943 |
| 2,368,451 | D'Alelio | Jan. 30, 1945 |
| 2,579,985 | Varela et al. | Dec. 25, 1951 |
| 2,635,083 | Cordier | Apr. 14, 1953 |
| 2,652,375 | Cordier et al. | Sept. 15, 1953 |